(12) United States Patent
Takechi

(10) Patent No.: US 11,051,501 B2
(45) Date of Patent: Jul. 6, 2021

(54) FISHING REEL

(71) Applicant: Shimano Inc., Sakai (JP)

(72) Inventor: Kunio Takechi, Sakai (JP)

(73) Assignee: SHIMANO INC., Sakai (JP)

(*) Notice: Subject to any disclaimer, the term of this patent is extended or adjusted under 35 U.S.C. 154(b) by 51 days.

(21) Appl. No.: 16/749,981

(22) Filed: Jan. 22, 2020

(65) Prior Publication Data

US 2020/0375165 A1    Dec. 3, 2020

(30) Foreign Application Priority Data

May 29, 2019  (JP) .............................. JP2019-100146

(51) Int. Cl.
*A01K 89/01* (2006.01)
*A01K 89/015* (2006.01)

(52) U.S. Cl.
CPC .............................. *A01K 89/0187* (2015.05)

(58) Field of Classification Search
CPC ............ A01K 89/0186; A01K 89/0187; A01K 89/01901; A01K 89/01904; A01K 89/01909; A01K 89/01929; A01K 89/1093; A01K 89/05
See application file for complete search history.

(56) References Cited

U.S. PATENT DOCUMENTS

| | | | | |
|---|---|---|---|---|
| 5,875,986 | A * | 3/1999 | Miyazaki | A01K 89/0155 242/261 |
| 6,672,526 | B1 * | 1/2004 | Bledsoe | A01K 89/015 242/255 |
| 2017/0172131 | A1 * | 6/2017 | Toake | A01K 89/01555 |
| 2017/0238516 | A1 * | 8/2017 | Ahmad | A01K 87/06 |
| 2018/0103627 | A1 * | 4/2018 | Takechi | A01K 89/01931 |
| 2018/0125049 | A1 * | 5/2018 | Toake | A01K 89/01928 |
| 2018/0199558 | A1 * | 7/2018 | Niitsuma | A01K 89/015 |
| 2018/0199559 | A1 * | 7/2018 | Takechi | A01K 89/01931 |

FOREIGN PATENT DOCUMENTS

JP    55-30143 Y2    7/1980

* cited by examiner

*Primary Examiner* — Emmanuel M Marcelo
(74) *Attorney, Agent, or Firm* — United IP Counselors, LLC

(57) ABSTRACT

A fishing reel includes a reel body, a drive shaft, a handle, a first roller clutch, and a second roller clutch. The reel body includes a tubular body-side accommodating part. The handle includes a handle arm extending in a direction intersecting the drive shaft, and a tubular handle-side accommodating part disposed adjacent to the body-side accommodating part in the axial direction of the drive shaft and partially accommodating the drive shaft. The first roller clutch is disposed in the body-side accommodating part of the reel body and prohibits rotation of the drive shaft in a fishing line releasing direction. The second roller clutch is disposed in the handle-side accommodating part and transmits only rotation of the handle in a fishing line winding direction to the drive shaft.

9 Claims, 4 Drawing Sheets

FISHING REEL

CROSS-REFERENCE TO RELATED APPLICATIONS

This application claims priority to Japanese Patent Application No. 2019-100146, filed May 29, 2019. The contents of that application are incorporated by reference herein in their entirety.

BACKGROUND

Technical Field

The present invention relates to a fishing reel, specifically a dual-bearing reel.

Background Information

Japanese Examined Utility Model Application Publication No. 55-30143 discloses a configuration of a dual-bearing reel in which a ratchet type one-way clutch is disposed on a handle. The one-way clutch transmits only rotation of the handle in a fishing line winding direction to the drive shaft, and does not transmit rotation of the handle in a fishing line releasing direction to the drive shaft.

BRIEF SUMMARY

In a conventional ratchet type one-way clutch, there has been a risk that water may enter the one-way clutch from the outside. In addition, there has been a problem that the handle rattles.

An object of the present invention is to provide a fishing reel, in which rattling of a handle is reduced, the fishing reel including a one-way clutch configured to transmit only rotation of the handle in a fishing line winding direction to a drive shaft.

Another object of the present invention is to provide a fishing reel, including a one-way clutch which transmits only rotation of a handle in a fishing line winding direction to a drive shaft, configured to restrain water from entering the one-way clutch.

A fishing reel according to one aspect of the present invention includes a reel body, a drive shaft, a handle, a first roller clutch, and a second roller clutch. The reel body includes a tubular body-side accommodating part. The drive shaft is disposed partially in the body-side accommodating part. The handle includes a handle arm extending in a direction intersecting with the drive shaft, and a tubular handle-side accommodating part partially accommodating the drive shaft and being adjacent to the body-side accommodating part in an axial direction of the drive shaft. The first roller clutch is disposed in the body-side accommodating part and prohibits rotation of the drive shaft in a fishing line releasing direction. The second roller clutch is disposed in the handle-side accommodating part and transmits, to the drive shaft, only rotation of the handle in a fishing line winding direction.

In the fishing reel, the handle is supported by the drive shaft via the roller clutch disposed in the handle-side accommodating part. Thus, rattling of the handle can be reduced more as compared with a case where a ratchet one-way clutch is employed for example.

Preferably, the fishing reel includes a first sealing mechanism configured to seal a gap between the body-side accommodating part and the handle-side accommodating part in the axial direction. In this case, water entrance to the first and second first roller clutches can be restrained.

Preferably, the first sealing mechanism includes a first annular convex portion protruding in the axial direction. The first annular convex portion is disposed on one of the body-side accommodating part and the handle-side accommodating part, and overlaps at least partially with the other of the body-side accommodating part and the handle-side accommodating part in the direction in which the handle arm extends. In this case, the simple configuration enables restraint of water from entering into the first and second roller clutches.

Preferably, the first sealing mechanism further includes a first annular concave portion configured to accommodate a tip of the first annular convex portion. The first annular concave portion is disposed on the other of the body-side accommodating part and the handle-side accommodating part. In this case, a labyrinth structure is formed by the first annular convex portion and the first annular concave portion in the axial direction between the body-side accommodating part and the handle-side accommodating part, further restraining water from entering into the first and second roller clutches.

Preferably, the fishing reel further includes a cover member integrally and rotatably attached to one end of the drive shaft and disposed to face the handle-side accommodating part in the axial direction, and a second sealing mechanism configured to seal a gap between the handle-side accommodating part and the cover member in the axial direction. In this case, it is possible to restrain water from entering the second roller clutch through the gap between handle-side accommodating part and the cover member.

Preferably, the second sealing mechanism includes a second annular convex portion protruding in the axial direction, and a second annular concave portion configured to accommodate a tip of the second annular convex portion. The second annular convex portion is disposed on one of the handle-side accommodating part and the cover member. The second annular concave portion is disposed on the other of the handle-side accommodating part and the cover member. In this case, a labyrinth structure is formed in the axial direction between the handle-side accommodating part and the cover member, further restraining water from entering into the second roller clutch.

Preferably, the fishing reel further includes a bearing disposed in the handle-side accommodating part and configured to support the drive shaft and the handle. In this case, the drive shaft and the handle are supported by the bearing disposed in handle-side accommodating part, further reducing rattling of the handle.

According to the present invention, in the fishing reel including the one-way clutch configured to transmit only rotation of the handle in the fishing line winding direction to the drive shaft, rattling of the handle can be reduced.

According to another disclosure of the present invention, in the fishing reel including the one-way clutch configured to transmit only rotation of the handle in the fishing line winding direction to the drive shaft, water can be restrained from entering the one-way clutch.

DETAILED DESCRIPTION

Figure 1:
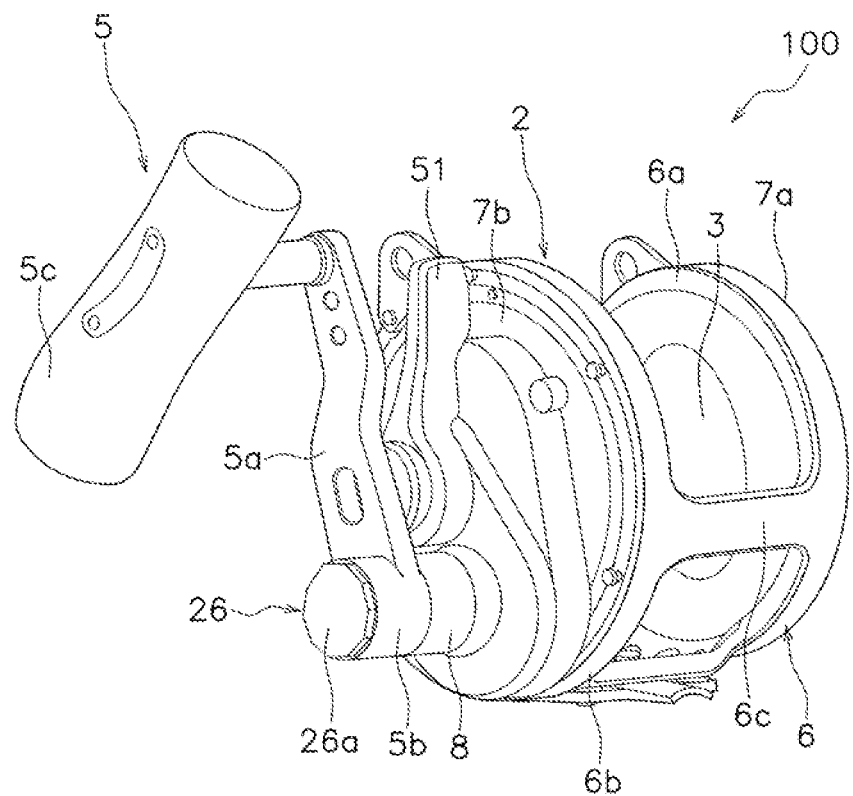
FIG. 1 is a perspective view of a fishing reel in which an embodiment of the present invention is employed.
Figure 2:
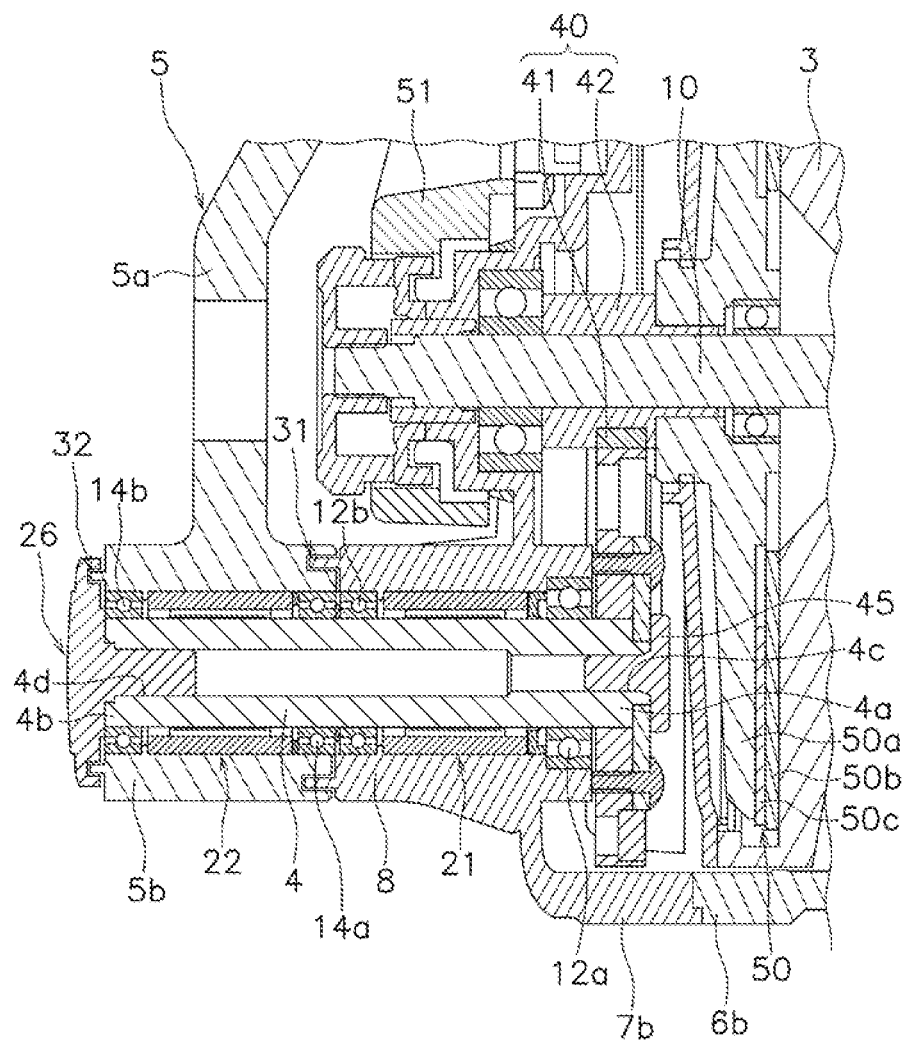
FIG. 2 is a cross-sectional view illustrating the parts around a drive shaft.
Figure 3:
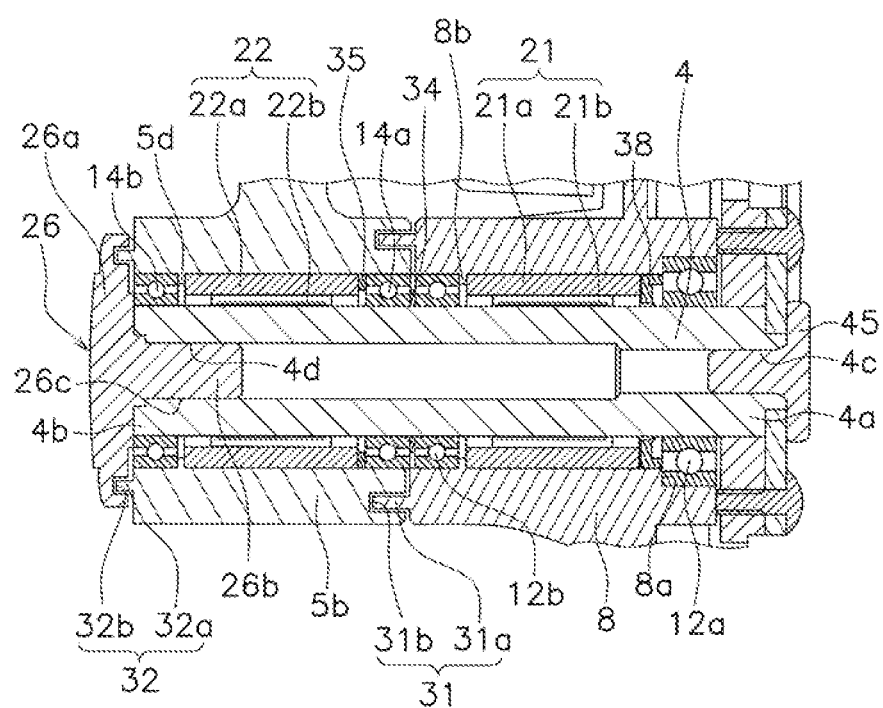
FIG. 3 is an enlarged cross-sectional view illustrating the parts around the drive shaft.

A fishing reel 100 employing an embodiment of the present invention is a lever-drag type double-bearing reel. The fishing reel 100 is configured to release a fishing line forward. As shown in FIGS. 1 to 3, the fishing reel 100 includes a reel body 2, a spool 3, a drive shaft 4, a handle 5, a first roller clutch 21, and a second roller clutch 22. The fishing reel 100 preferably includes a cover member 26, a first seal mechanism 31, and a second seal mechanism 32.

In the following description, during fishing, the direction in which the fishing line is released is referred to as the "front", and the opposite direction is referred to as the "rear". Moreover, the term "right and left" means the right and left directions when the fishing reel 100 is viewed from the front. The direction in which the drive shaft 4 (see FIG. 2) extends is referred to as the "axial direction", the direction orthogonal to the drive shaft 4 is referred to as "radial direction", and the direction around the axis of the drive shaft 4 is referred to as the "circumferential direction."

The reel body 2 includes a frame 6, a first side cover 7a, a second side cover 7b, and a body-side accommodating part 8. The frame 6 includes a first side plate 6a, a second side plate 6b, and a plurality of connections 6c.

The first side plate 6a is disposed on the right side of the frame 6. The second side plate 6b is disposed on the left side of the frame 6 with an interval from the first side plate 6a in the axial direction. The plurality of connections 6c extend in the axial direction and connect between the first side plate 6a and the second side plate 6b.

The first side cover 7a is located on the right side of the frame 6, and covers the right side of the first side plate 6a of the frame 6. In the present embodiment, the first side cover 7a is formed integrally with the frame 6. The second side cover 7b is located on the left side of the frame 6, and covers the left side of the second side plate 6b of the frame 6.

The body-side accommodating part 8 is formed to extend in the axial direction from near the lower portion of the side surface of the second side cover 7b. The body-side accommodating part 8 extends in a direction away from the second side plate 6b. The body-side accommodating part 8 is integrally formed with the second side cover 7b. The body-side accommodating part 8 is tubular, and in the present embodiment, the body-side accommodating part 8 is formed in a cylindrical shape. The body-side accommodating part 8 includes, at both ends, bearings 12a and 12b arranged for supporting the drive shaft 4. The bearing 12a is positioned by a step 8a that is located on an inner peripheral portion of the body-side accommodating part 8. The bearing 12b is positioned by a positioning projection 8b that is located on the inner peripheral portion of the body-side accommodating part 8.

The spool 3 is rotatably supported, by the reel body 2, between the first side plate 6a and the second side plate 6b. The spool 3 is rotatably supported by a spool shaft 10 that passes through the center of the spool 3. The spool shaft 10 extends in the axial direction and is supported by the reel body 2 so as to be movable in the axial direction. The spool shaft 10 rotatably supports the spool 3 via a pair of bearings (not shown) attached to the spool shaft 10.

The drive shaft 4 has a first end (right end) 4a and a second end (left end) 4b. The first end 4a is rotatably supported by the reel body 2 via the bearing 12a. The second end 4b is supported by a bearing 14b disposed in a handle-side accommodating part 5b, which is described later, of the handle 5. The drive shaft 4 is partially located in the body-side accommodating part 8. The drive shaft 4 is a cylindrical shaft, and includes, at both ends, female screw portions 4c and 4d located on inner peripheral surfaces.

The handle 5 is rotatably disposed on the reel body 2. Only the rotation of the handle 5 in a fishing line winding direction is transmitted to the drive shaft 4 by the second roller clutch 22.

The handle 5 has a handle arm 5a and the handle-side accommodating part 5b. The handle arm 5a extends from the outer peripheral portion of the handle-side accommodating part 5b in a direction intersecting the drive shaft 4. In the present embodiment, the handle arm 5a extends in the radial direction. A grip portion 5c for rotating the handle 5 is attached to the handle arm 5a.

The handle-side accommodating part 5b is formed integrally with the handle arm 5a at the end portion of the handle arm 5a that is close to the drive shaft 4. The handle-side accommodating part 5b is tubular, and in the present embodiment, is formed in a cylindrical shape. The handle-side accommodating part 5b is adjacent to the body-side accommodating part 8 in the axial direction. The handle-side accommodating part 5b is disposed to face the body-side accommodating part 8 in the axial direction. The handle-side accommodating part 5b is disposed on the left side of the body-side accommodating part 8 so that an accommodating space of the body-side accommodating part 8 and an accommodating space of the handle-side accommodating part 5b are continuous in the axial direction. A slight gap is defined between the handle-side accommodating part 5b and the body-side accommodating part 8. The drive shaft 4 is partially disposed in the handle-side accommodating part 5b. Bearings 14a and 14b are disposed at both ends of the handle-side accommodating part 5b. The bearings 14a and 14b support the drive shaft 4 and the handle 5. An annular spacer 34 is disposed between the bearing 14a and the bearing 12b. The spacer 34 is in contact with an inner ring of the bearing 14a and an inner ring of the bearing 12b. The bearing 14b is positioned by a positioning protrusion 5d located on an inner peripheral portion of the handle-side accommodating part 5b.

A rotation transmission mechanism 40 transmits rotation of the drive shaft 4 in the fishing line winding direction via a drag mechanism 50 to the spool 3. The rotation transmission mechanism 40 includes a drive gear 41 and a pinion gear 42. The drive gear 41 is fixed to an outer peripheral portion of the drive shaft 4 close the first end 4a by a fixing member 45 that is screwed into the female screw portion 4c of the drive shaft 4. The pinion gear 42 is engaged with the drive gear 41. The pinion gear 42 is rotatably mounted on the spool 3.

The drag mechanism 50 includes a braking disc 50a and a friction disc 50b. The brake disc 50a is coupled to the pinion gear 42 so as to be integrally rotatable. The friction disc 50b is disposed to face the brake disc 50a in the axial direction and is coupled to the spool 3 so as to be integrally rotatable. The brake disc 50a includes a friction portion 50c that is frictionally engaged with the friction disc 50b. The rotation of the drive shaft 4 in the fishing line winding direction is transmitted through the drive gear 41, the pinion gear 42, the brake disc 50a and the friction disc 50b, which causes the spool 3 to rotate. It should be noted that the drag force is controlled by manipulating a drag adjustment lever 51.

The first roller clutch 21 is a roller-type one-way clutch. The first roller clutch 21 is disposed in the body-side accommodating part 8 of the reel body 2. The first roller clutch 21 prohibits rotation of the drive shaft 4 in a releasing direction of the fishing line.

The first roller clutch 21 has an outer ring 21a and a rolling element 21b. The outer ring 21a is non-rotatably attached to the body-side accommodating part 8. A cam surface (not shown) is formed on an inner peripheral surface of the outer ring 21a. The rolling element 21b has a cylindrical shape and is disposed between the outer ring 21a and the drive shaft 4. The rolling element 21b transmits the rotation in the fishing line releasing direction to the outer ring 21a. Since the outer ring 21a is non-rotatably attached to the body-side accommodating part 8, the rotation of the drive shaft 4 in the fishing line releasing direction is prohibited. In contrast, the rolling element 21b does not transmit the rotation in the fishing line winding direction to the outer ring 21a. That is, the first roller clutch 21 allows the drive shaft 4 to rotate in the fishing line winding direction.

The second roller clutch 22 is a roller-type one-way clutch. The second roller clutch 22 is disposed in the handle-side accommodating part 5b. The second roller clutch 22 transmits only the rotation of the handle 5 in the fishing line winding direction to the drive shaft 4.

The second roller clutch 22 includes an outer ring 22a and a rolling element 22b. The outer ring 22a is non-rotatably attached to the handle-side accommodating part 5b. A cam surface (not shown) is formed on an inner peripheral surface of the outer ring 22a. The rolling element 22b has a cylindrical shape and is disposed between the outer ring 22a and the drive shaft 4. The rolling element 22b transmits only the rotation of the handle 5 in the fishing line winding direction to the drive shaft 4. The rolling element 21b does not transmit the rotation of the handle 5 in the fishing line winding direction to the drive shaft 4.

An annular spacer 35 is disposed between the second roller clutch 22 and the bearing 14a in the axial direction. The spacer 35 is in contact with the outer ring 22a of the second roller clutch 22 and the outer ring of the bearing 14a.

The cover member 26 is attached to the second end 4b of the drive shaft 4 so as to be integrally rotatable. The cover member 26 is disposed so as to face the handle-side accommodating part 5b in the axial direction.

The cover member 26 includes a cover part 26a and a fixing part 26b. The cover part 26a is disposed to face the left end surface of the handle-side accommodating part 5b. A slight gap is defined between the cover part 26a and the handle-side accommodating part 5b. The cover part 26a is in contact with the inner ring of the bearing 14b and the end surface of the second end 4b of the drive shaft 4 in the axial direction. The fixing part 26b extends from the cover part 26a in the axial direction. The fixing part 26b has a male screw portion 26c on an outer peripheral surface thereof. The male screw portion 26c is screwed with the female screw portion 4d of the drive shaft 4.

The first seal mechanism 31 prevents water from entering the body-side accommodating part 8 and the handle-side accommodating part 5b from the outside. In the present embodiment, the first seal mechanism 31 seals the gap between the body-side accommodating part 8 and the handle-side accommodating part 5b of the handle 5 in the axial direction. The first seal mechanism 31 includes a first annular convex portion 31a and a first annular concave portion 31b.

The first annular convex portion 31a protrudes in the axial direction and extends annularly in the circumferential direction. The first annular convex portion 31a is provided on one of the body-side accommodating part 8 and the handle-side accommodating part 5b. The first annular convex portion 31a at least partially overlaps the other of the body-side accommodating part 8 and the handle-side accommodating part 5b in the direction in which the handle arm 5a extends.

In the present embodiment, the first annular convex portion 31a is provided on the body-side accommodating part 8, and protrudes from the end surface of the body-side accommodating part 8 that faces the handle-side accommodating part 5b, toward the end surface of the handle-side accommodating part 5b. The first annular convex portion 31a extends toward the first annular concave portion 31b. The first annular convex portion 31a partially overlaps the handle-side accommodating part 5b in the radial direction.

The first annular concave portion 31b is provided in either the body-side accommodating part 8 or the handle-side accommodating part 5b. In the present embodiment, the first annular concave portion 31b is provided in the handle-side accommodating part 5b. The first annular concave portion 31b is recessed in the axial direction from the end surface of the handle-side accommodating part 5b facing the body-side accommodating part 8, and extends annularly in the circumferential direction. The first annular concave portion 31b is configured to accommodate the tip of the first annular convex portion 31a. A labyrinth structure is formed, between the body-side accommodating part 8 and the handle-side accommodating part 5b in the axial direction, by the first annular convex portion 31a and the first annular concave portion 31b of the first seal mechanism 31. The labyrinth structure formed by the first annular convex portion 31a and the first annular concave portion 31b seals the gap between the body-side accommodating part 8 and the handle-side accommodating part 5b in the axial direction. Note that at least one of the first annular convex portion 31a and the first annular concave portion 31b has been processed with water repellent treatment.

The second seal mechanism 32 seals the gap between the handle-side accommodating part 5b and the cover member 26 in the axial direction. The second seal mechanism 32 includes a second annular convex portion 32a and a second annular concave portion 32b.

The second annular convex portion 32a protrudes in the axial direction and extends annularly in the circumferential direction. The second annular convex portion 32a is provided on either of the handle-side accommodating part 5b or the cover member 26. The second annular convex portion 32a at least partially overlaps the other of the handle-side accommodating part 5b and the cover member 26 in the direction in which the handle arm 5a extends.

In the present embodiment, the second annular convex portion 32a is provided on the handle-side accommodating part 5b and protrudes from the end surface of the handle-side accommodating part 5b facing the cover member 26, toward the cover part 26a of the cover member 26. The second annular convex portion 32a extends toward the second annular concave portion 32b. The second annular convex portion 32a partially overlaps the cover part 26a of the cover member 26 in the radial direction.

The second annular concave portion 32b is provided in either of the handle-side accommodating part 5b or the cover member 26, where the second annular convex portion 32a is not provided. In the present embodiment, the second annular concave portion 32b is provided in the cover member 26. The second annular concave portion 32b is recessed in the axial direction from the end face of the cover part 26a of the cover member 26 facing the handle-side accommodating part 5b, and extends annularly in the circumferential direction. The second annular concave portion 32b is configured to accommodate the tip of the second annular convex portion 32a. A labyrinth structure is formed, between the handle-side accommodating part 5b and the cover member 26 in the axial direction, by the second annular convex portion 32a and the second annular concave portion 32b of the second seal mechanism 32. The labyrinth structure formed by the second annular convex portion 32a and the second annular concave portion 32b seals the gap between the handle-side accommodating part 5b and the cover member 26 in the axial direction. Note that at least one of the second annular convex portion 32a and the second annular concave portion 32b has been processed with water repellent treatment.

In the fishing reel 100 configured as described above, the second roller clutch 22 transmits, to the drive shaft 4, only the rotation of the handle 5 in the fishing line winding direction. That is, the load from the handle 5 in the fishing line releasing direction does not act on the reel body 2. As a result, it is possible to prevent the first roller clutch 21 from being damaged by receiving a load from the handle 5 in the fishing line releasing direction. In addition, the handle 5 is rotatable in the fishing line releasing direction to change the position of the handle 5 in the rotation direction to an arbitrary position, which allows, for example, the fishing line to be wound up by reciprocating the handle 5 within a certain range.

The handle 5 is supported by the drive shaft 4 via the second roller clutch 22 disposed in the handle-side accommodating part 5b. The handle 5 is also supported by the bearings 14a and 14b arranged in the handle-side accommodating part 5b. Thereby, for example, rattling of the handle 5 can be reduced as compared with a case where a ratchet type one-way clutch is employed. In addition, since the first seal mechanism 31 and the second seal mechanism 32 can restrain water from entering the body-side accommodating part 8 and the handle-side accommodating part 5b, which leads to corrosion protection of the first roller clutch 21 and the second roller clutch 22.

An annular seal member 38 having a lip shape that tapers toward the drive shaft 4 is disposed between the first roller clutch 21 and the bearing 12a in the axial direction. The seal member 38 is in contact with the outer peripheral surface of the drive shaft 4. The seal member 38 restrains water from entering the first roller clutch 21 beyond the first end 4a of the drive shaft 4. In the present embodiment, since the drive shaft 4 has a cylindrical shape, the seal member 38 can be easily employed. The position of the seal member 38 is not limited to the present embodiment.

Other Embodiments

Although one embodiment of the present invention has been described above, the present invention is not limited to the above embodiment, and various modifications can be made without departing from the scope of the present invention. Specifically, the embodiments described in the present specification can be arbitrarily combined as necessary.

In the above embodiment, the present invention is applied to a lever drag type dual-bearing reel. However, for example, the present invention can be applied to a dual-bearing reel that includes a clutch mechanism for transmitting and blocking the rotation of the handle 5 to the spool 3. Further, the first roller clutch 21 and the second roller clutch 22 can each have an inner ring.

In the embodiment described above, the first seal mechanism 31 and the second seal mechanism 32 form a labyrinth structure together with the annular convex portion and the annular concave portion. The structure made with the first seal mechanism 31 and the second seal mechanism 32, however, is not limited to the above embodiment. For example, in the body-side accommodating part 8 and the handle-side accommodating part 5b, a plurality of annular convex portions can be arranged so as to overlap in the radial direction. Moreover, they do not necessarily form a labyrinth structure.

Figure 4:
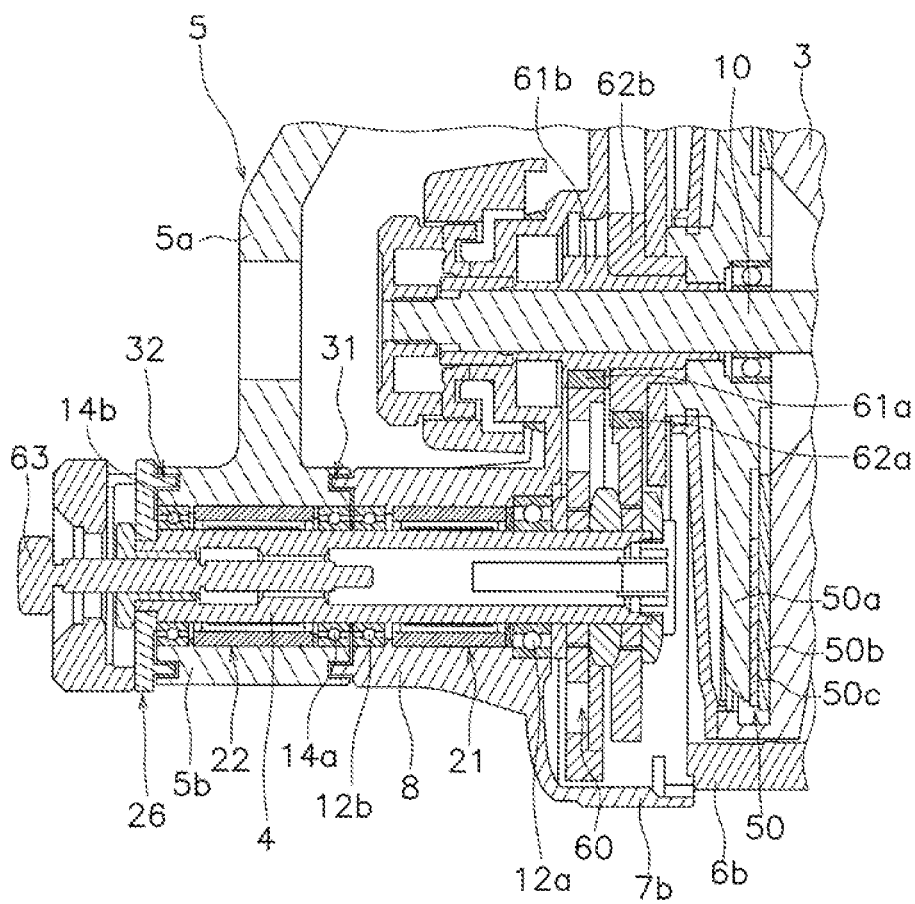
FIG. 4 is a cross-sectional view illustrating the parts around a drive shaft according to a modification.

FIG. 4 is a cross-sectional view illustrating the parts around the drive shaft 4 according to a modification. In FIG. 4, the same reference numerals are given to the same configurations as those in the above embodiment. In the modification, the rotation transmission mechanism 40 includes a speed change mechanism 60 that is capable of switching speeds of the rotation of the handle 5 between a high speed and a low speed.

The speed change mechanism 60 includes a first drive gear 61a for high-speed winding, a first pinion gear 61b that meshes with the first drive gear 61a, a second drive gear 62a for low-speed winding, and a second pinion gear 62b that meshes with the second drive gear 62a. Switching between the high speed and the low speed is performed by movement in the axial direction of an operation shaft 63 biased by a biasing member (not shown). The details of the speed change mechanism 60 are the same as those in the prior art, and thus the detailed description thereof is omitted.

REFERENCE SIGNS LIST

2 Reel body
3 Spool
4 Drive shaft
5 Handle
5a Handle arm
5b Handle-side accommodating part
8 Body-side accommodating part
14a Bearing
14b Bearing
21 First roller clutch
22 Second roller clutch
26 Cover member
31 First seal mechanism
31a First annular convex portion
31b First annular concave portion
32 Second seal mechanism
32a Second annular convex portion
32b Second annular concave portion
100 Fishing Reel

What is claimed is:
1. A fishing reel comprising:
a reel body including a tubular body-side accommodating part;
a drive shaft disposed partially in the body-side accommodating part;
a handle that includes a handle arm extending in a direction intersecting with the drive shaft, and a tubular handle-side accommodating part configured to partially accommodate the drive shaft and disposed adjacent to the body-side accommodating part in an axial direction of the drive shaft;

a first roller clutch disposed in the body-side accommodating part and configured to prohibit rotation of the drive shaft in a fishing line releasing direction; and a second roller clutch disposed in the handle-side accommodating part and configured to transmit only rotation of the handle in a fishing line winding direction to the drive shaft.

2. The fishing reel according to claim 1, further comprising a first sealing mechanism configured to seal a gap between the body-side accommodating part and the handle-side accommodating part in the axial direction.

3. The fishing reel according to claim 2, wherein the first sealing mechanism includes a first annular convex portion protruding in the axial direction, the first annular convex portion disposed on one of the body-side accommodating part and the handle-side accommodating part, and overlapping at least partially with the other of the body-side accommodating part and the handle-side accommodating part in the direction in which the handle arm extends.

4. The fishing reel according to claim 3, wherein the first sealing mechanism further includes a first annular concave portion configured to accommodate a tip of the first annular convex portion, the first annular concave portion disposed on the other of the body-side accommodating part and the handle-side accommodating part.

5. The fishing reel according to claim 1, further comprising a cover member integrally and rotatably attached to one end of the drive shaft and disposed to face the handle-side accommodating part in the axial direction, and a second sealing mechanism configured to seal a gap between the handle-side accommodating part and the cover member in the axial direction.

6. The fishing reel according to claim 5, wherein the second sealing mechanism includes a second annular convex portion protruding in the axial direction and a second annular concave portion configured to accommodate a tip of the second annular convex portion, the second annular convex portion disposed on one of the handle-side accommodating part and the cover member, the second annular concave portion disposed on the other of the handle-side accommodating part and the cover member.

7. The fishing reel according to claim 1, further comprising a bearing disposed in the handle-side accommodating part and configured to support the drive shaft and the handle.

8. The fishing reel according to claim 1, wherein the first roller clutch includes a first outer ring, and a first rolling element disposed between the first outer ring and the drive shaft, and the first outer ring is non-rotatably attached to the body-side accommodating part.

9. The fishing reel according to claim 1, wherein the second roller clutch includes a second outer ring, and a second rolling element disposed between the second outer ring and the drive shaft, and the second outer ring is non-rotatably attached to the handle-side accommodating part.

* * * * *